UNITED STATES PATENT OFFICE.

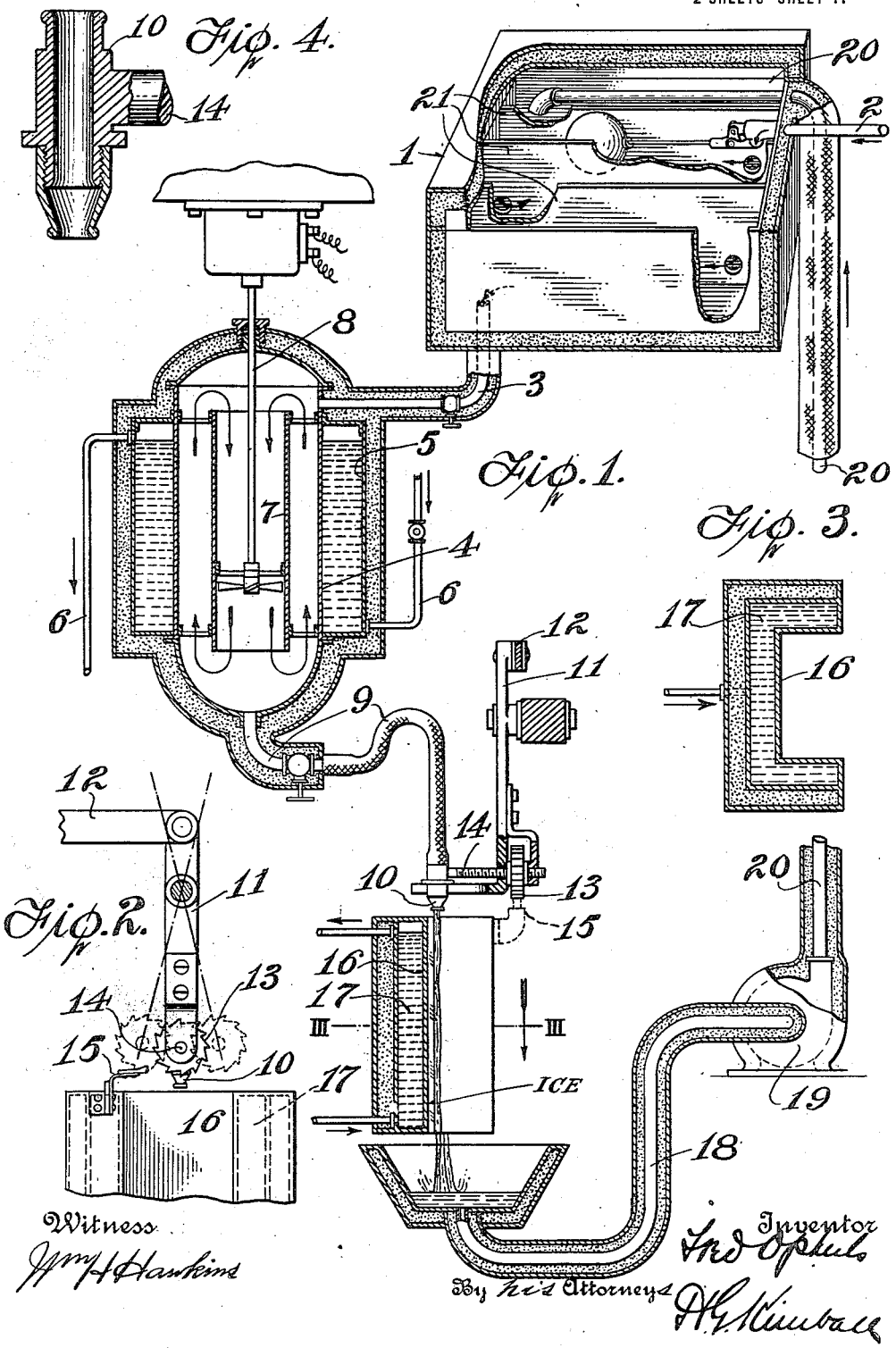

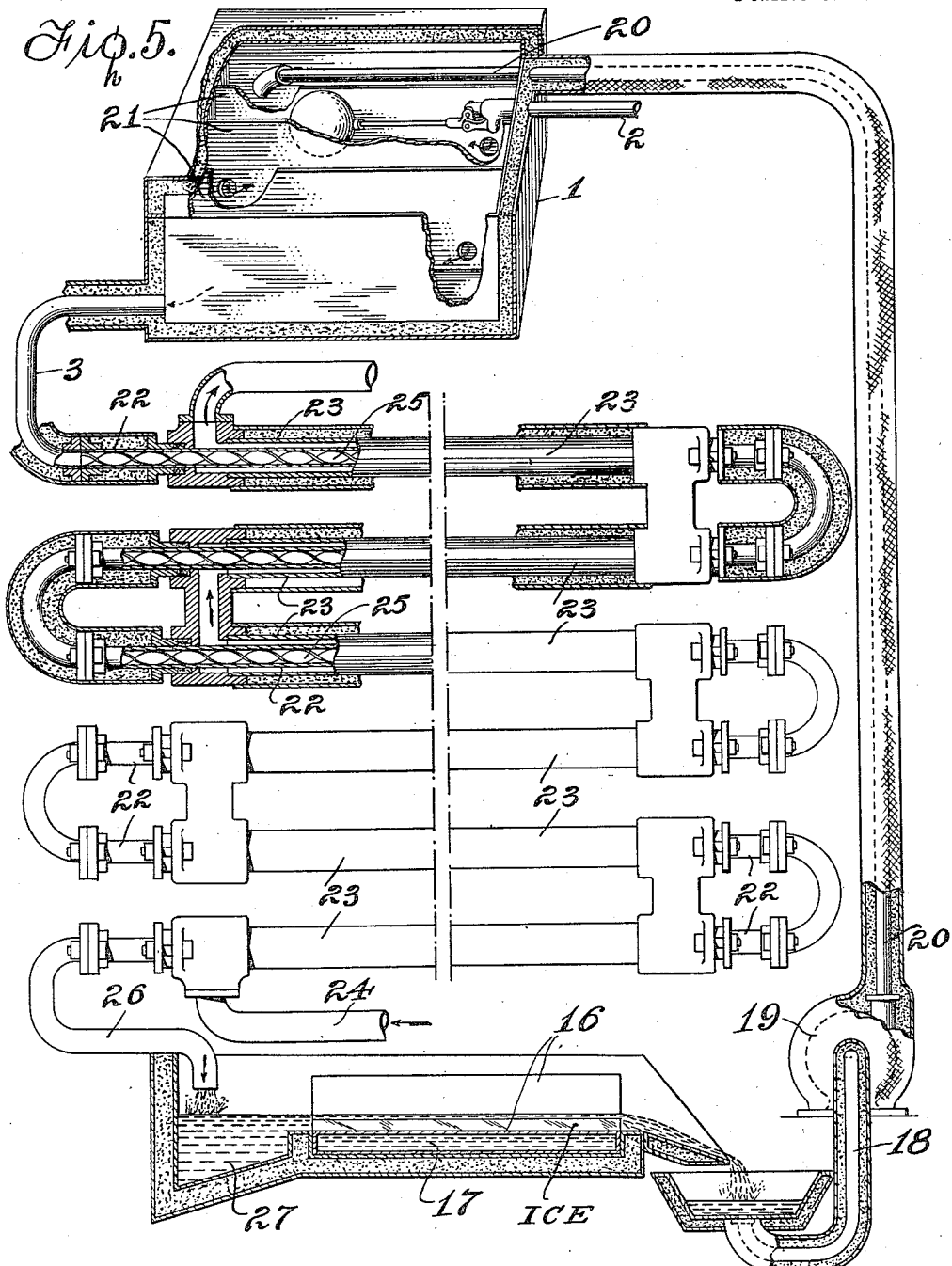

FRED OPHULS, OF BROOKLYN, NEW YORK.

APPARATUS FOR ICE MANUFACTURE.

1,267,795.          Specification of Letters Patent.     Patented May 28, 1918.

Application filed November 4, 1915. Serial No. 59,523.

*To all whom it may concern:*

Be it known that I, FRED OPHULS, a citizen of the United States, residing at 323 Lenox road, borough of Brooklyn, city and State of New York, have invented the following-described Improvements in Apparatus for Ice Manufacture.

The invention provides means of manufacturing marketable ice from distilled or raw water, particularly the latter, with greater efficiency than heretofore. To this end it involves the supercooling of the water below 32° F. under certain conditions, as hereinafter set forth.

According to existing methods, ice is produced by causing it to build up on one or more refrigerating surfaces entirely or mainly by the refrigerating effect of such surfaces. In these methods the disadvantage is present that the rate at which the ice forms decreases rapidly, under a constant refrigerating intensity, as its thickness increases, for the heat to be extracted from the water to be frozen must pass through ice already deposited on the refrigerating surfaces, and this layer of ice, on account of its poor heat conductivity, acts as an ever increasing resistance to the transfer of heat. The utilization of such methods, therefore, involves a temperature difference between the water not yet frozen and the refrigerating surface, which is relatively high and correspondingly expensive to maintain. Notwithstanding that the water is forecooled, in some cases, to near the freezing point, the necessary temperature difference is still high. I have discovered that by supercooling the water to be frozen prior to its introduction to the place of refrigeration, the temperature difference may be very greatly reduced and maintained low during the whole process of freezing, with a coincident decrease in the time required for producing a cake of ice of commercial dimensions, and, further, that the total energy required for supercooling the water and cooling the refrigerating surface is less than would be otherwise required to produce the same result by any existing method. In actual practice of this new method, I have succeeded in producing clear marketable ice of commercial size with less total energy output than has heretofore been considered possible.

In the accompanying drawings I have illustrated, more or less diagrammatically, a form of apparatus that is suitable for carrying on the method, but it will be understood, and will be apparent from this description, that the method is not dependent upon the particular form of apparatus employed.

Figure 1 illustrates the principal elements and their connection, partly in section;

Fig. 2, a side or top view of the refrigerating surface;

Fig. 3, a section of the same on line III—III;

Fig. 4, a section of the nozzle; and

Fig. 5, a modified form of apparatus.

In these drawings, the source of water to be frozen is represented by a tank 1, in which a constant water level is maintained by a ball float valve controlling the supply-pipe 2, or otherwise. The tank is covered with a heat-insulating material, as indicated, and the water circulates through the same, passing out through a similarly insulated pipe 3, to the supercooler. The latter consists of a receptacle 4, cylindrical in the present case and surrounded by a jacket chamber 5, through which brine or ammonia, or other refrigerating medium or agent circulates. The pipes for the circulation of the refrigerant are indicated at 6, and may be assumed to be part of any suitable refrigerating apparatus not necessary to be described. The interior of the supercooler is provided with a centrally located partition or draft-pipe 7, and a propeller on the end of the shaft 8 of an electric motor, revolves within this pipe creating a circulation of the water through and around the same and within the chamber 4. The latter is closed at top and bottom, preferably by dome-shaped end plates, as indicated, and the propeller shaft passes to the exterior through a packing gland in one end plate. The circulation of the water keeps it in commotion, while its heat is being abstracted by the surrounding refrigerating jacket, so that it may cool to a point below 32° F. and approaching 28° F., without freezing and without the adherence or formation of ice on the interior parts of the cooler chamber. The water thus supercooled flows from the chamber 4, through a pipe 9, to a discharge nozzle 10, whence it is discharged upon the refrigerated surface on which the ice is to be formed.

The pipe 9 is constituted in part of rubber hose, although it might be of other material, but since, in this form, the nozzle is adapted to be moved, it is preferably flexible to accommodate the movement. The interior of the pipe, as well as of the chamber, is made free of sharp interior projections, or corners, all of the latter being carefully rounded and also polished. The nozzle itself is also smoothly polished on its interior and delivers a smooth-surfaced stream or jet of the supercooled water. These precautions provide against the premature formation of ice or ice crystals which, if once started, cause some of the water in the pipe as well as in the cooler, to flash instantaneously into ice or slush. By avoiding conditions which stimulate crystallization, the supercooling may be safely carried well below 32° F., without danger of flashing. Each apparatus will be found, however, to have its own critical temperature at which flashing occurs, and which must be first ascertained for best results. Although made of the same material and operated under the same conditions, the critical temperature of different coolers will vary somewhat, but with proper attention to the considerations herein explained, they can be operated to cool the water below the freezing point without crystallization. The walls of the supercooler chamber may be made of rolled sheet-iron.

The refrigerating surface may be variously related to the nozzle and is desirably so located that the supercooled water will flow over it or over the ice-layer forming thereon in about the plane of the surface or layer itself, so that it will move smoothly thereover without splashing or spattering. Any means of applying the water to the surface without undue commotion is satisfactory. As the surface is necessarily of considerable extent as compared to the diameter of the nozzle, the latter is kept in a slow oscillating motion, in or adjacent to the said plane, so as to distribute the water over the whole surface. The mechanical appliance for imparting the oscillation is indicated in the drawing as comprising a pivoted frame 11, operated by a reciprocating rod 12, and carrying a ratchet wheel 13 and traverse screw 14. The nozzle 10 is mounted in a slideway at the end of the frame and connected to the screw 14, for which the ratchet wheel forms the nut, and a fixed pawl 15 serves as the operating means for rotating the wheel. On each reciprocation of the frame the wheel encounters the pawl, which turns it one tooth at a time, so that thereby the nozzle is advanced on each oscillation in the direction in which the ice is forming. The advance is slight and only sufficient to accommodate the increasing thickness of the ice layer, so that the supercooled water will continue to flow smoothly and evenly thereover.

The refrigerating surface may also be formed in various ways. In the present case it consists of a jacketed metal wall 16 (Fig. 3) having a main wall or floor portion and two sides approximating the dimensions of a commercial ice cake, and the jacket 17 thereof is heat-insulated. Brine or a refrigerating agent may be circulated through the jacket and may be derived from the same refrigerating system that supplies the cooler.

The supercooled water flowing over the refrigerating surface forms immediately into ice and with a minimum transfer of heat from the former to the latter, as the effect of the supercooling. The surplus water (at 32° F.) flows off the plate into a basin provided for the purpose, from which it is drawn through an insulated pipe 18, by a pump 19 and returned through an insulated pipe 20 to the supply tank 1. The returned water may contain more or less ice crystals suspended therein, and it is necessary to guard against the passage of the same to the supercooler. They are therefore separated or collected in the supply tank, which is provided with a number of alternately arranged or staggered shelves or partitions 21, for the purpose. These produce sufficient stagnation of motion in the tank to permit the crystals to rise and float on the surface, while only pure water without crystals passes through the perforations and into the pipe 3, leading to the cooler. It is important that every crystal be excluded from the supercooler, inasmuch as the presence of a single crystal therein will flash the whole mass into a mixture of ice crystals and water and obstruct the production of clear ice accordingly.

I prefer to use ammonia as the refrigerant circulating directly through the jacket space 17, and to adjust the flow thereof to maintain a temperature of the refrigerating surface 16, of about 28°. This is a considerably higher temperature than is ordinarily used in making ice, but is sufficient in the new process by reason of the supercooling of the water which, being so near to the ice condition, requires but a moderate freezing temperature to effect the change of state. As the ice is built up on the refrigerating surface mainly by the deposit obtained by the change of state of the supercooled water, it follows that the insulating qualities of the increasing layer of ice are of relatively less effect and that the formation of ice may thus continue rapidly until the desired size of cake or plate is produced. The water consumed in the formation of the ice is replenished automatically by the float valve.

As already stated, the supercooler above described may be substituted by other means for supercooling the water, and in Fig. 5 I have illustrated an alternate form. Here the supply tank 1 is the same as already described and the clear water therefrom enters a brine- or ammonia-jacketed coil, in which it is supercooled. This coil consists of several limbs or sections of pipe 22, connected in series relation by long-radius elbows and surrounded by outer pipe sections 23, through which the brine or ammonia flows from a supply pipe 24, which is at the opposite end of the coil from the water entrance. The course of the brine or ammonia, excludes the elbow connections, which are heavily protected by insulation. The construction will be plain from the figure. Within the water pipes a spiral partition 25, extending from end to end of each limb, serves to mix the water in passing and insure that all parts of it shall be homogeneously cooled without ice formation. The water supercooled in this form of cooler passes by discharge pipe 26 into a pocket 27 adjacent one end of the refrigerating surface 16 and accumulating therein flows over the said surface becoming converted into ice under the economic conditions already explained. It will be noted that the pocket 27 avoids the necessity of a traversing and oscillating discharge nozzle, the refrigerating surface in this case being horizontal, in a transverse sense. The surplus water therefrom flows into a catch basin as before, from which it is returned to the supply tank, completing the water circulation.

In both forms of supercooler the critical point at which flashing is likely to occur, is first determined by experiment, and thereafter the operation of the refrgerating apparatus of such cooler is set or adjusted, other conditions remaining constant, to keep the water just above such point and less than the normal freezing point, and so long as the apparatus is designed for constantly bringing fresh portions of water against the refrigerated wall of the cooler, the flash point may be kept at the desired low point. It is to be understood that the apparatus is provided with the necessary adjustment and shut-off devices where needed.

From the foregoing it will be observed that the principle of the invention may be utilized in apparatus of widely different character, and I wish to emphasize that there is no intention of limiting this patent to any particular form of apparatus or arrangement thereof except as defined in the following claims.

I claim:

1. Ice-making apparatus, comprising a supercooler capable of cooling the water below 32° F. and having means for keeping the water in commotion so as to prevent its freezing, an ice-cake forming support, and means for delivering the supercooled water over the support during the building up of an ice-cake thereon.

2. Ice-making apparatus, comprising a supercooler capable of cooling the water below 32° F. and having means for keeping the water in commotion so as to prevent its freezing, a support affording a congealing surface, and means for flowing the supercooled water in contact with said surface and the ice-cake building thereon.

3. Apparatus for making ice, comprising a supercooler, an ice-cake forming support, means whereby the supercooled water from the supercooler passes upon or over the surface of said support, and means for returning the excess water to the supercooler free of ice crystals.

4. Apparatus for making ice, comprising a supercooler adapted to cool water below 32° F. without freezing, a refrigerated surface maintained at less than 32° F., means for passing the water over such surface to form ice thereon, means for returning the excess water to the cooler, and a device for preventing the passage of ice crystals to the cooler.

5. Apparatus for making ice, comprising a cooler for the water, a congealing surface and a moving nozzle whereby such water is caused to flow over the said surface.

6. Apparatus for making ice, comprising a cooler for the water, a congealing surface, a nozzle for discharging the water upon the surface, and means for traversing the nozzle with the advancing thickness of the ice layer.

7. Apparatus for making ice, comprising a congealing surface, a nozzle for discharging water upon the surface, and means for oscillating the nozzle substantially parallel with the surface and for traversing it outwardly therefrom.

8. Apparatus for making ice, comprising a congealing surface, a nozzle disposed to direct a stream of water substantially parallel with and over the surface, and means for traversing the nozzle with the advancing thickness of the ice layer.

9. Apparatus for making ice, comprising a circulating system for water to be frozen including a supercooler therefor, a refrigerated surface receiving the supercooled water and on which it is converted into ice, and a separator to prevent the passage of ice crystals to the cooler, in combination with means for cooling the water in the supercooler below 32° F. without freezing, and means for maintaining the refrigerating surface at a temperature which converts such supercooled water into ice.

In testimony whereof, I have signed this specification in the presence of two witnesses.

FRED OPHULS.

Witnesses:
JOHN T. CROWLEY,
K. L. GRANT.